Figure 1:
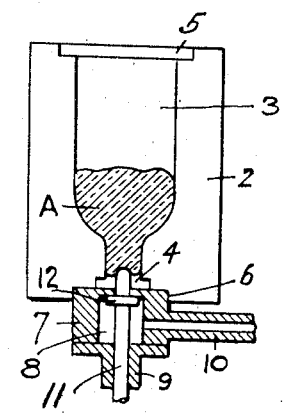

Aug. 14, 1928.

K. E. PEILER 1,680,746

METHOD OF MOLDING BOTTLES IN SINGLE MOLD MACHINES

Filed Dec. 6, 1923

INVENTOR
Karl E. Peiler
By Kay, Totten, Brown,
Attorneys

Patented Aug. 14, 1928.

1,680,746

UNITED STATES PATENT OFFICE.

KARL E. PEILER, OF HARTFORD, CONNECTICUT, ASSIGNOR TO HARTFORD-EMPIRE COMPANY, OF HARTFORD, CONNECTICUT, A CORPORATION OF DELAWARE.

METHOD OF MOLDING BOTTLES IN SINGLE-MOLD MACHINES.

Application filed December 6, 1923. Serial No. 678,693.

My invention relates to the manufacture of blown glassware and its principal object is to provide a simple and effective process of making glassware completely in a single mold without the use of a preliminary blank or parison mold.

Another object of my invention is to provide suitable apparatus of a novel character for carrying out the above-indicated process.

Bottles and other forms of hollow blown glassware are commonly made by placing a charge of molten glass in a parison mold, pressing or blowing the mold-charge in the parison mold to form a blank or parison, transferring the parison to a finishing mold and expanding the parison to fill the finishing mold. This ordinary system requires mechanism for transferring the glass from the blank mold to the finishing mold, and also usually requires the use of neck-rings and other attachments in addition to the molds.

My present invention aims to simplify the manufacture of blown glassware by utilizing a single mold in which a charge of molten glass is deposited, preferably while the mold is inverted. A settling blow is then introduced into the mold from above, or suction is applied to the mold cavity from below, or both combined, to force the glass into the neck cavity of the mold. When this has been done, and the usual preliminary cavity has been formed in the glass at the neck of the mold, air under pressure is introduced into the mold from beneath, thereby expanding the glass upward. This expansion may be interrupted when the glass has been partially expanded, thereby producing the equivalent of an ordinary parison, after which the mold may be reverted and the article expanded to fill the mold as in the ordinary finishing operation. Or, if desired, the glass may be expanded to completely fill the mold while the mold is in its original inverted position, in which case the finished article is made not only in a single mold but in a single position of the mold.

The method wherein the glass is blown completely without reverting the mold has the advantage of extreme simplicity, but it is not adapted for all classes of ware because the finishing blow must be completed very quickly after the glass has been placed in the mold in order to prevent uneven cooling of the glass which would cause uneven distribution in the walls of the finished article. Therefore, I prefer to use the single-position method for ware of the smaller sizes, and to employ the process wherein the mold is reverted before the finishing blow for the larger kinds of ware and for articles which present any difficulties in their manufacture.

Figure 4:
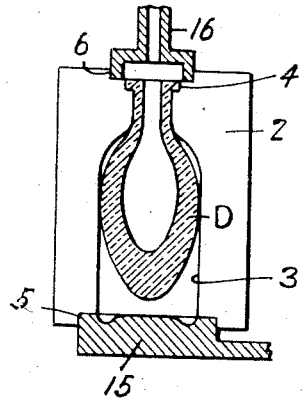
Figure 5:
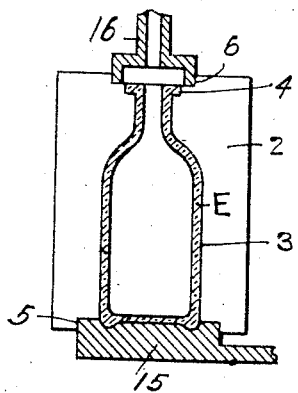
Figure 6:
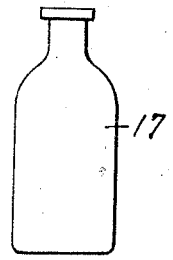

In the accompanying drawings, Figs. 1 to 5 inclusive are a progressive series of diagrammatic vertical sectional views showing the several steps of my process of single-mold blowing, and Fig. 6 is a side view of a bottle produced by this process.

In Fig. 1 of the drawing the numeral 2 indicates an inverted bottle mold having a body cavity 3, a neck cavity 4, an upper recess 5 and a lower recess 6. The lower recess 6 is adapted to receive a combined neck-forming and blowing device consisting of a member 7 having an internal cavity 8, a bottom closure 9 and a lateral pipe 10 which may be connected by ordinary means, not shown, to any suitable source of air pressure and also, if desired, to a suitable source of suction. The top of the member 7 and the bottom closure 9 are provided with openings through which extends a plunger 11 having a collar 12 which limits its upward and downward movement to the positions shown in Figs. 1 and 3, respectively, and which, when the plunger is in its upper position, may shut off communication between the interior of the mold and the pipe 10.

Figure 2:
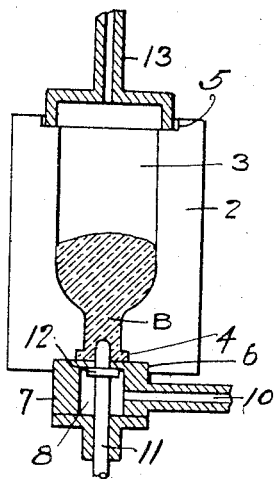

In Fig. 2 the same parts are shown as in Fig. 1 with the addition of a blow-head 13 which is received in the recess 5 of the mold 2 and is utilized to apply the settling blow to the glass in the mold.

Figure 3:
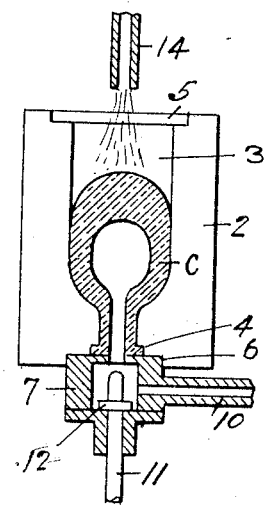

Fig. 3 shows the same structure as Fig. 1, with the difference that the plunger 11 is shown in its lower position wherein communication is established between the pipe 10 and the interior of the glass in the mold. Fig. 3 also shows a pipe 14 through which air may be introduced into the mold during the counter-blowing operation so as to chill the exposed surfaces of the glass to any desired extent.

Fig. 4 shows the mold 2 reverted upon a bottom closure 15 with a blow-head 16 received in the cavity 6 ready to apply the finishing blow to the partially blown article which has been produced in the manner shown in Fig. 3.

Fig. 5 shows the same arrangement as Fig. 4 after the glass has been completely expanded to fill the mold, and Fig. 6 shows a finished bottle 17.

The operation of making an article by means of this apparatus is begun by arranging the mold and the neck-pressing and counter-blowing device in the manner shown in Fig. 1. A charge of molten glass is deposited in the mold 2 and assumes somewhat the position shown at A, Fig. 1. The blow-head 13 is then placed in position in the recess 5 of the mold and applies a settling puff of air which causes the glass to settle into the neck cavity 4 of the mold and around the upper end of the plunger 11, thereby assuming the position shown at B, Fig. 2.

The blow-head 13 is then removed, the plunger 11 is lowered to the position shown in Fig. 3, and a counter-blow of air may then be admitted through the pipe 10 at a controllable rate, thereby expanding the glass within the body cavity 3 of the mold 2 at the desired rate and to the desired degree. A cooling blast may be supplied through the pipe 14 in order to cool the surface of the glass which is exposed to the air, and which would normally cool at a slower rate than glass which is in contact with the walls of the mold.

The counter-blowing operation may be omitted, or may be made very short, or may be carried on until the glass has been blown to about the shape shown at C, Fig. 3. In either case the mold 2 may then be reverted to the upright position shown in Fig. 4, where the glass will stretch down or elongate under the influence of gravity. While in this position one or more puffs of air may be applied to the interior of the glass by means of the blow-head 16. Such puffs may be applied at a controllable rate and may have a controllable duration, so as to expand the glass to the desired amount and in the desired manner. The intervals between puffs and between the last puff and the final blowing operation may be varied in duration to permit the desired amount of stretching down or elongation of the glass. In this way various effects may be secured, and the distribution of the glass in the blown article may be controlled.

As a result of such of these operations as have been employed, the glass will assume somewhat the position shown at D in Fig. 4. The final blast of air is then applied through the blow-head 16 and the glass is thus expanded to the finished shape shown at E in Fig. 5, the desired final distribution of glass in the walls of the article having been obtained by proper proportioning of the various necessary operations.

As stated above, this blowing process may be varied by omitting the reverting and finish-blowing operations, the mold 2 being left in the position of Fig. 3, a closure member such as the member 15 being there inserted in the recess 5 of the mold, and the counter-blast supplied through the pipe 10 being continued until the glass fills the mold. In such a case the counter-blast must be supplied very quickly after the glass is settled in the mold.

So far as I am aware, I am the first to produce a completely blown article of hollow glassware in a single mold from a charge of glass introduced into the mold in a detached mass as distinguished from being inserted in the mold by means of a blow-pipe. I also believe that I am the first to produce a completely blown article in a single mold from a charge of glass placed in the mold while the mold is inverted. It is to be understood that the structure herein shown, as well as the steps of the process, may be varied as desired within the scope of the appended claims.

I claim as my invention:

1. The process of making hollow glassware that comprises depositing a charge of molten glass in a cavity of a finish blow mold, compacting the glass in the lower end of said cavity to form the neck finish of the ware, applying blowing pressure to said charge and directing cooling air through the charge receiving end of said mold while it is open to chill the exposed portion of said mold charge.

2. The process of making hollow glassware that comprises depositing a charge of molten glass in a cavity of an inverted blow mold, compacting said charge in the lower end of said cavity to form the neck of the ware by pressure exerted through the upper or bottom portion of said mold, applying pressure to the lower or neck portion of said mold to expand said charge, and directing a jet of cooling air through the open bottom portion of said mold to chill the exposed portion of said mold charge.

3. The process of making hollow glassware that comprises depositing a charge of molten glass into the cavity of an inverted blow mold through the open bottom portion thereof, compacting said mold charge in the neck portion of said mold cavity by fluid pressure applied through the bottom portion of said mold, applying blowing air to said mold charge through the neck portion of said mold to expand the same into contact with the walls of said cavity, and directing a jet of cooling air through the open bottom portion of said mold cavity to chill the exposed portion of said mold charge.

4. The process of making hollow glassware that comprises depositing a charge of molten glass in the mold cavity of an inverted blow mold through the open bottom portion thereof, compacting said mold charge into the neck portion of said cavity by fluid pressure applied above the mold charge, expanding said mold charge into contact with the walls of said mold by fluid pressure applied through the neck portion of said mold and simultaneously applying cooling air through the open bottom portion of said mold cavity to chill the exposed portion of said charge during the expanding operation.

5. The process of making hollow glassware that comprises depositing a charge of molten glass in the mold cavity of an inverted blow mold through the open bottom portion thereof, compacting the mold charge in the lower portion of said cavity by fluid pressure applied above the glass, expanding the mold charge into contact with the walls of said cavity by fluid pressure applied below the glass and simultaneously applying cooling air through the open bottom portion of said molds to chill the exposed portion of the glass during the expanding operation, moving said mold to a neck-up position, applying a bottom closure to the open end of said mold, allowing the glass to sag under the action of gravity and expanding the glass to final form in said mold.

In testimony whereof I, the said KARL E. PEILER, have hereunto set my hand.

KARL E. PEILER.